Feb. 6, 1940.  J. T. COVINGTON  2,189,707
CULTIVATOR MECHANISM
Filed March 18, 1939  3 Sheets-Sheet 3
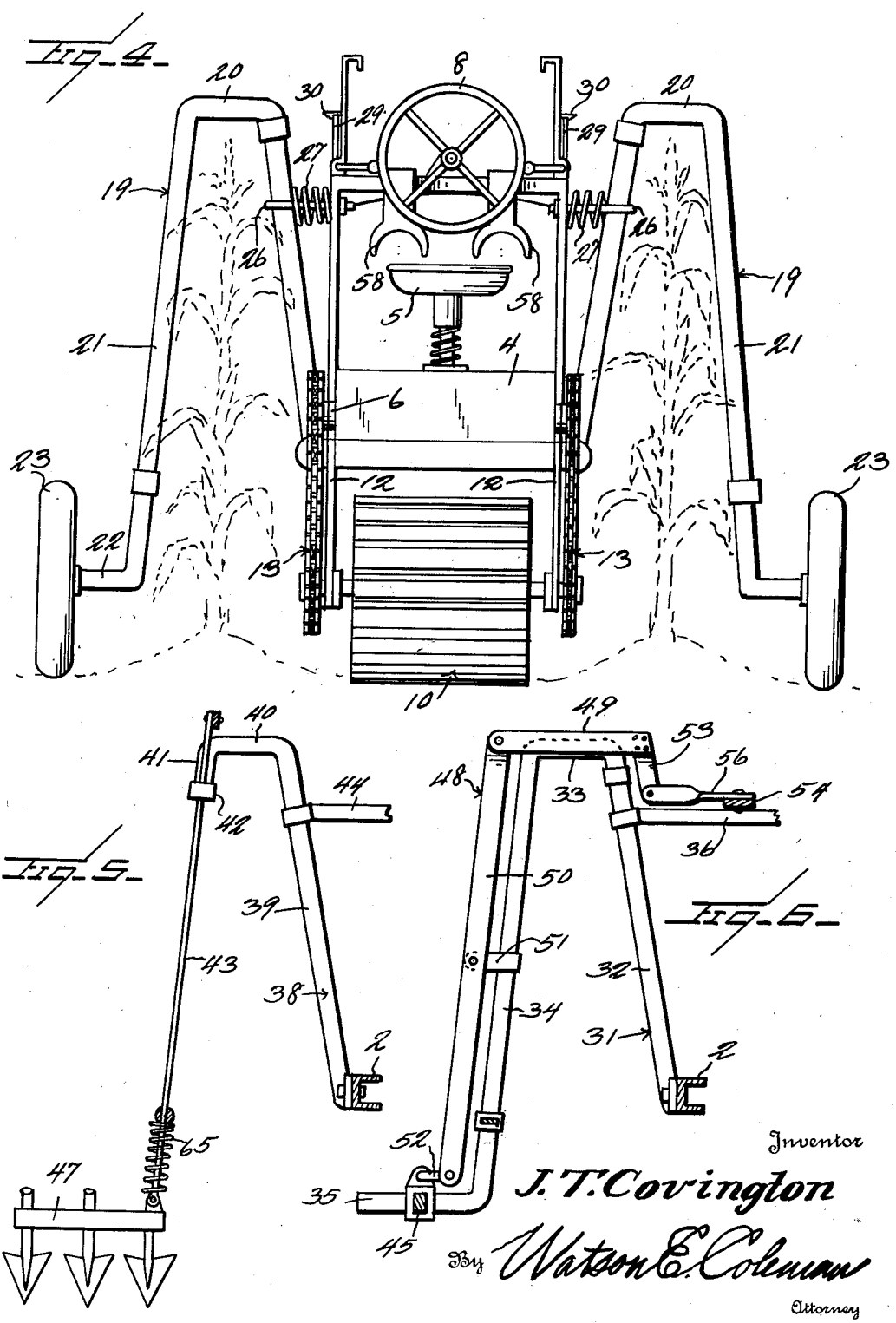

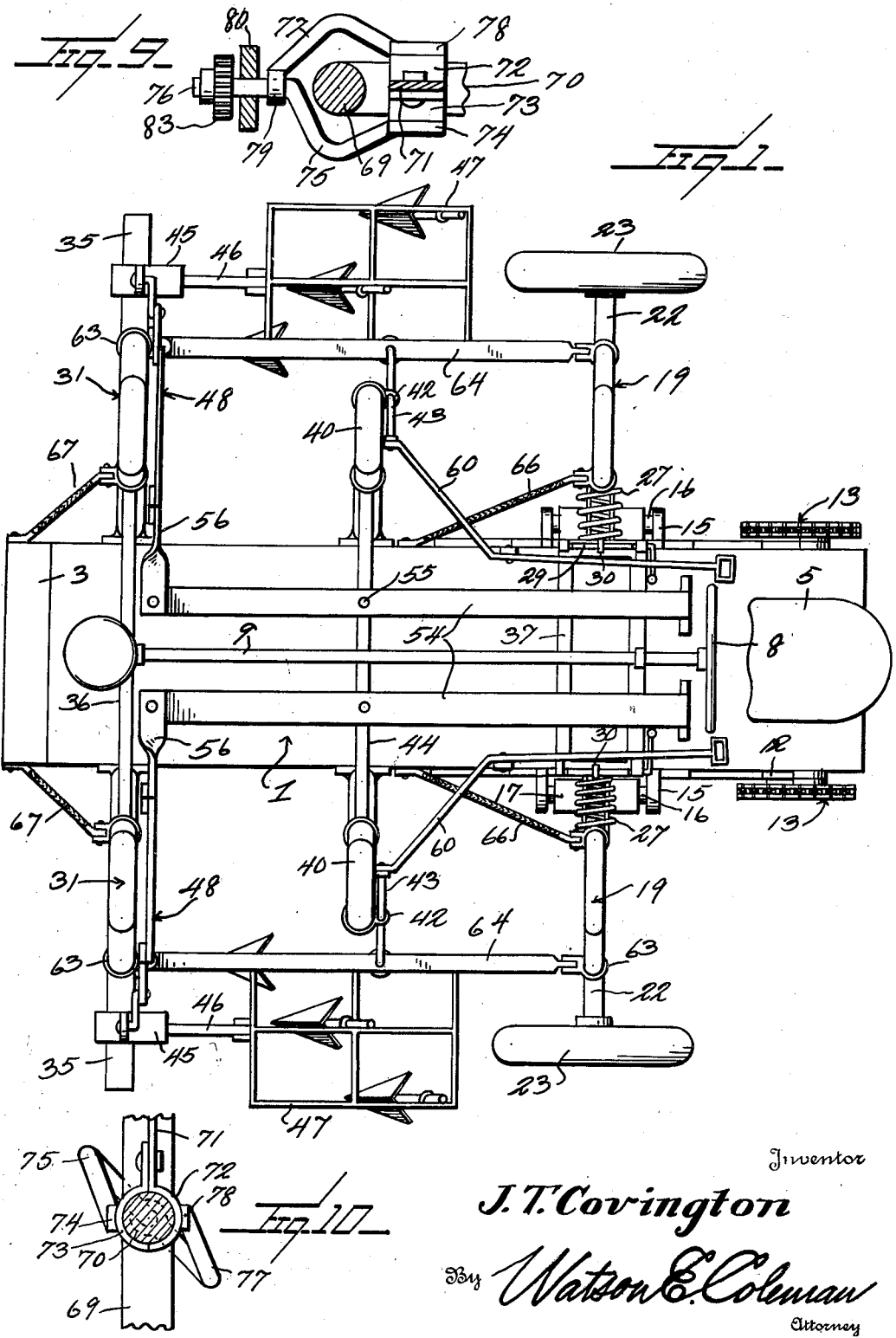

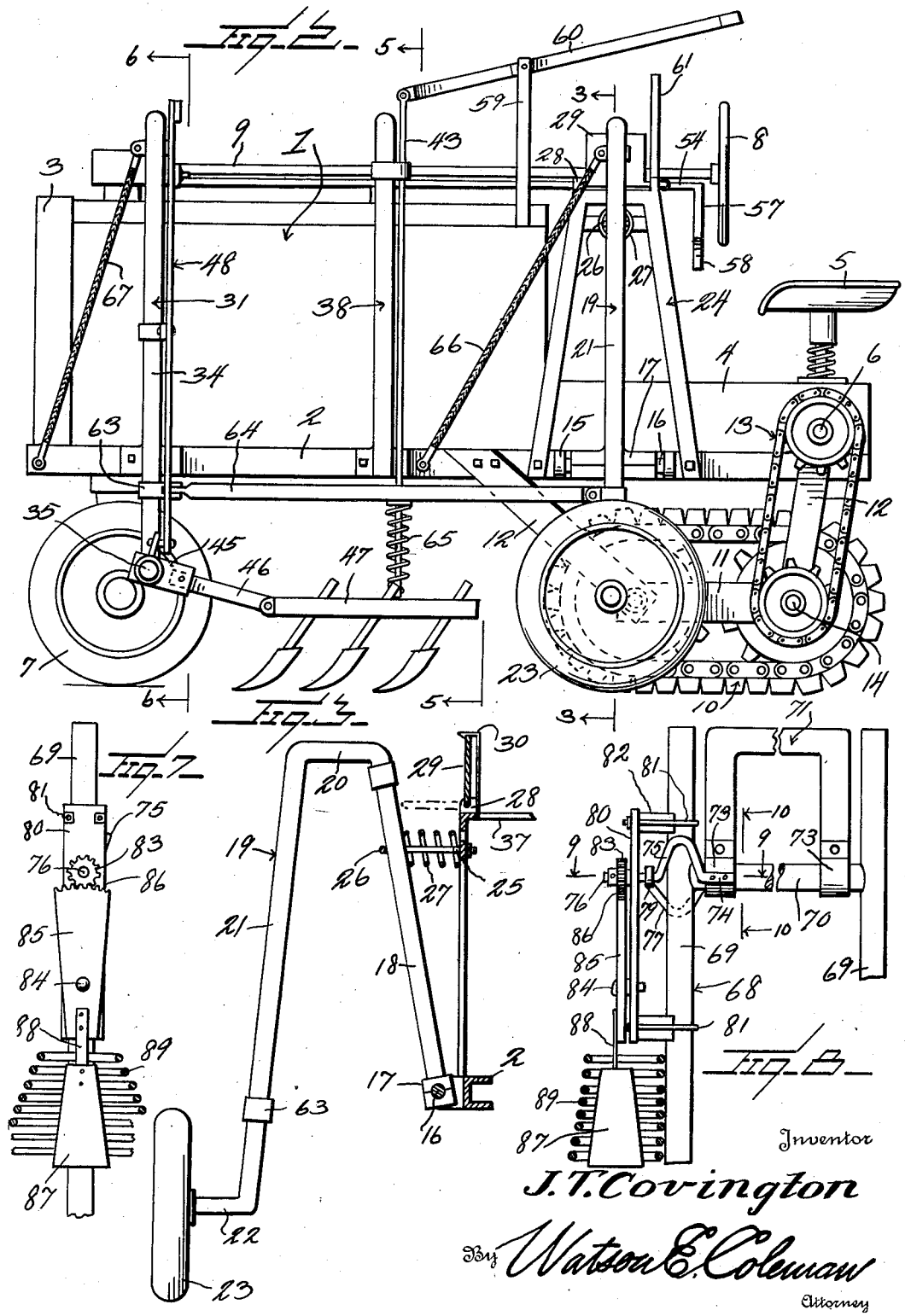

Patented Feb. 6, 1940

2,189,707

UNITED STATES PATENT OFFICE 2,189,707

CULTIVATOR MECHANISM

John T. Covington, Durant, Okla.

Application March 18, 1939, Serial No. 262,722

13 Claims. (Cl. 97—232)

This invention relates generally to the class of agricultural implements and pertains particularly to improvements in cultivators.

The primary object of the present invention is to provide a novel mechanism by means of which the cultivation of growing plants may be effectively carried out without the necessity of having to carry moving mechanical parts from the machine across the plants with the consequent danger of damaging the plants while the cultivating operation is being carried out.

Another object of the invention is to provide a novel cultivating mechanism for growing plants which may be readily attached to any standard make of tractor whereby the desired power may be obtained for drawing cultivating plows through the ground at the outer sides of two rows of plants while the tractor passes along between such rows, the mechanism including novel means for coupling the plows with the tractor whereby damage to the intervening rows of plants will be effectively avoided.

A further object of the invention is to provide in a cultivator mechanism adapted to be attached to a tractor as described, a novel means for facilitating the vertical and lateral adjustment of the plows to take care of variations in the widths of rows and to free the plows from the ground when the mechanism is being turned around.

A still further object of the invention is to provide an improved cultivator mechanism in which a centrally positioned propelling mechanism is provided for a tractor structure whereby such tractor may conveniently pass between the rows of standing plants, and novel means is employed in association with the propelling mechanism whereby the tractor structure as a whole is stabilized or held steady to prevent tipping over.

Still another object of the invention is to provide in a cultivator mechanism of the character set forth, a novel means whereby the lateral shifting of the cultivator plows may be accomplished by the operator of the tractor, by the use of the knees, so that the plows may be caused to follow an irregular furrow or row of plants without the necessity of the operator having to remove his hands from the steering mechanism of the machine.

A still further object of the invention is to provide in a machine of the character above set forth and having novel means for stabilizing the structure against lateral tipping, a novel mounting for the wheel supported stabilizing mechanism whereby such mechanism may be given free oscillatory movement in a vertical plane or may be secured against such movement so that the entire rear supporting mechanism for the tractor and attached parts will be secured as a rigid structure.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the cultivator structure embodying the present invention.

Fig. 2 is a view in side elevation of the same.

Fig. 3 is a sectional view on the line 3—3 of Fig. 2.

Fig. 4 is a view in rear elevation of the structure.

Fig. 5 is a sectional view on the line 5—5 of Fig. 2.

Fig. 6 is a sectional view on the line 6—6 of Fig. 2.

Fig. 7 is a view illustrating in side elevation a modification of the lock plate.

Fig. 8 is a view in front elevation of the same.

Fig. 9 is a sectional view on the line 9—9 of Fig. 8.

Fig. 10 is a section on the line 10—10 of Fig. 8.

Referring now more particularly to the drawings, the numeral 1 generally designates the housing of a tractor in which the power plant is enclosed, such power plant being supported in one type of tractor structure upon a chassis frame 2 at the front end of which is the usual radiator unit 3, while the rear end supports the transmission mechanism indicated generally by the numeral 4 and the seat 5 for the operator. As is usual in tractor structures, the driving axle extends laterally from the rear part of the transmission mechanism, as indicated at 6, while at the forward end of the machine, the steering front wheels 7 are located upon the longitudinal center of the machine, these wheels being controlled through the medium of the steering wheel 8 and the usual coupling mechanism between this wheel and the front wheels which includes the horizontal steering shaft 9.

As is well known, certain types of tractors have the driving axles 6 connected through a suitable supporting gearing mechanism with the laterally disposed rear driving or traction wheels, these wheels being normally set outwardly from the sides of the machine. This position of the tractor wheels makes the tractor unsuitable for use between rows of plants such as corn or the like, therefore, in carrying out the present invention, such wheels are removed and there is disposed beneath the tractor at the rear thereof, the endless or caterpillar traction unit which is indicated generally by the numeral 10 and which includes a suitable frame 11 connected with the frame 2 of the tractor by suitable beams 12 whereby the unit will be rigidly held beneath the transmission mechanism of the machine and will be in line with the front wheels 7. A chain and sprocket coupling 13 is established between the wheels 6 and a driven axle 14 for the caterpillar unit.

In certain types of tractors, the construction is such that there is not provided a base frame of the character here shown and indicated by the numeral 2, in which case, in order that the other parts of the present mechanism may be properly mounted upon the machine, such tractor would be supplied with the necessary supporting frame.

The base or supporting frame of the tractor has secured to each side adjacent the rear of the tractor structure and between suitable spaced laterally projected bearing ears 15, a short longitudinally extending shaft 16. These shafts are disposed directly opposite one another and each has secured thereabout the two halves of a bearing box 17, one of which halves is formed integral with the inner leg 18 of an inverted substantially U-shaped structure, indicated generally by the numeral 19, which will be hereinafter referred to as a wheel bow. The upper end of the bow comprises a short horizontal portion 20 which forms the yoke of the U, while the outer leg of the U is indicated at 21. This outer leg is of greater length than the inner leg 18, so that it extends downwardly below the frame 2, as shown in Fig. 3, and terminates in the horizontal laterally extending stub axle 22 which carries a wheel 23.

Extending upwardly from each side of the frame 2 at the inner side of each wheel bow 19, is a frame 24 which will be referred to as the stabilizing frame. This frame includes a horizontal bar portion 25 through which extends a U-bolt 26 which encircles the adjacent leg 18 of the bow and which passes through and supports between this leg 18 and the bar 25, the expansion spring 27. The spring 27 normally urges the bow to swing outwardly and to maintain a vertical position when the wheel 23 is on a surface level with that occupied by the traction unit 10.

The top of the frame 24 carries a pair of hinge ears 28 between which is oscillatably mounted a lock plate 29. This plate is normally held in vertical position by the spring latch 30, but when released so as to swing outwardly and downwardly to horizontal position in the manner indicated in dotted lines in Fig. 3, it will have its outer edge in close proximity to the inner leg 18 of the adjacent bow 19 and will thus serve as a locking means for the bow for preventing the latter from oscillating on its shaft 16.

Disposed at the forward end of the frame 2 and upon each side thereof, is a plow hitch bow indicated generally by the numeral 31 and shown in detail in Fig. 6, wherein it will be seen that this bow comprises an inner leg 32, the lower end of which is securely fastened to the frame 2, a horizontal yoke portion at the top, as indicated at 33, and an outer leg 34 which extends downwardly below the frame 2 and terminates in the outwardly extending hitch bar 35. These plow hitch bows have the upper ends of the legs 32 connected by the cross bar 36 and the upper ends of the rebound frames 24 are also indicated by a cross bar which is indicated by the numeral 37.

Disposed at opposite sides of the machine and between the bows 19 and 31 are intermediate bows which are indicated generally by the numeral 38 and which will be referred to as the plow lift bows. Each of these bows consists of a long inner leg 39, the lower end of which is secured to the frame 2, as shown in Fig. 5, a horizontal yoke portion 40 at the top and the short outwardly and downwardly extending leg 41, which has secured thereto a guide 42 for the plow lift rod 43. These bows 38 are likewise connected by a cross bar, which is indicated by the numeral 44.

The hitch bar 35 of each plow hitch bow has slidably and rockably mounted thereon a hitch bearing 45 to which is pivotally coupled an end of a link 46, the other end of which is connected with the cultivator plow unit 47. The lower end of the adjacent plow lift rod 43 is connected with this unit, as shown in Fig. 5. The bearing 45 being slidable upon its supporting bar 35, permits of the lateral adjustment of the attached plow unit, so that the two units of the cultivator structure may be moved in or out as may be necessary to follow the rows of plants which the machine is cultivating. This movement of the plow units is accomplished through the medium of a rocking frame indicated generally in Fig. 6 by the numeral 48, which is mounted upon each plow hitch bow. This rock frame comprises a horizontal disposed top bar portion 49 having one end connected with the vertical outer bar 50 which is pivotally coupled substantially midway of its ends, as indicated at 51, with the adjacent leg 34 of the bow 31, the bar 50 substantially paralleling this leg of the bow. At its lower end the bar 50 is loosely connected by a link 52 with the adjacent slide bearing 45. At the inner end of the horizontally disposed bar 49, a short downwardly extending arm 53 is secured.

Extending longitudinally of the machine across the tops of the transverse brace bars 36 and 44 are control rods or bars for the plow shifting frame units 48, which are indicated by the numeral 54. Each of these bars 54 is pivoted, as at 55, to the center cross brace bar 44, for oscillation upon a vertical axis. At its forward end, each bar 54 is connected by the laterally extended link 56 with the adjacent depending arm 53 while at its rear end each bar 54 terminates in the downturned portion 57 which in turn terminates in a downwardly opening collar 58 in which the knee or upper portion of the leg of the operator of the vehicle may be engaged when the operator is upon the seat 5.

From the foregoing, it will be readily apparent that by oscillating the bars 54, the operator may also oscillate in a vertical plane the frames 48 and thereby effect the sliding of the attached bearings 45 upon the supporting hitch bars so as to move the plowing units inwardly or outwardly as may be desired, and this adjustment of the plow units can be accomplished while the operator maintains his hold upon the steering wheel 8.

Secured to a suitable part of the machine between the wheel bows and the adjacent plow lift bows are standards 59, each of which supports the vertically oscillatable lever bar 60. The forward end of each lever bar 60 is coupled with the upper end of the adjacent plow lift rod 43. Adjacent the rear end of each lever bar, a suitable upstanding hook or catch 61 is provided so that the lever bar may be secured thereto and held with the forward end raised when it is desired to maintain the attached plow disengaged from the ground.

The outer leg 21 of each wheel bow has secured thereto adjacent its lower end, a collar 62, while a corresponding collar 63 is secured to the lower end of the outer leg 34 of the adjacent plow hitch bow 31. These collars are loosely coupled together by a horizontal tie rod 64. Each tie rod is provided with a suitable opening through which the adjacent plow lift rod 43 may pass, and interposed between each rod 64 and the frame of the underlying plow unit 47, and encircling the rod 43, is an expansion spring 65. This spring constantly maintains a downward pressure upon the underlying plow unit, and it will be readily seen that the spring will be placed under tension when the plow unit is raised by means of the adjacent control lever 60.

Each of the wheel bows is braced from its upper end by a flexible cable 66, one end of which is attached to the upper end of the leg 18, while the lower end is secured to the frame 2, as shown in Fig. 2, and each of the plow hitch bows is likewise braced by a flexible cable 67 which is connected at one end with the upper end of the inner leg 32 of that bow while the lower end is attached to the frame 2.

In practice the bows will be of sufficient length to have their horizontal yoke portions from 5 to 6 feet above the ground when they are in position upon the tractor frame in the manner illustrated. These bows may thus be passed over standing rows of corn or other tall plants, and, as illustrated in Fig. 1, the cultivator is operated by running the tractor upon the tandem supports consisting of the front wheel 7 and the rear caterpillar unit 10, between two rows of plants, so that each row will pass under the alined bows at one side of the tractor structure. The supporting wheels 23 will run on the ground between one adjacent row of plants and the next row farthest from the tractor and since each plow unit is drawn behind a front or plow hitch bow 31 and in advance of a wheel 23, it will be seen that the ground area between each row of plants lying laterally of the tractor will be thoroughly cultivated. By providing the wheels 23 and the bows for coupling them with the tractor bow, stabilizing means is provided which prevents the tractor from tipping in the event that it is run over hilly ground. The spring cushions 29 interposed between the inner legs of the wheel bows and the adjacent stabilizing frames, permit of a certain amount of vertical oscillation of these frames, but this may be eliminated, and the frames held rigid by shifting the locking plates 29 to their horizontal positions where they will lie between the pivot ears 28 and the adjacent bow leg.

The tie rod 64 serves to brace the front and rear bows and the tendency to lateral movement of the upper ends of the front and rear bows is restrained by the flexible cables 66 and 67.

While the means illustrated and described for raising the plow units has been shown as comprising a rigid lift bar and lever, it is to be understood that this lifting means may be supplanted by a lifting chain if found desirable and that any suitable means may be employed for pulling such chain upwardly for the purpose of lifting the plow units.

From the foregoing, it will be readily apparent that with the cultivator of the character herein described, the desirable working of the earth along the rows of standing plants may be readily accomplished without endangering the plants by passing thereover any moving mechanism. At the same time, a novel means has been provided whereby a tractor may be converted for use between rows of corn or other plants, thus making it possible to employ a machine for cultivating such standing crops which may be operated at greater speed than is possible to operate other means for pulling cultivating machinery along the plant rows.

In Figs. 7 to 9 inclusive, there is illustrated a modification of the lock plate structure shown mounted upon the frames 24. This modified lock plate is of an automatically operating type. The structure 68 corresponds to the frame 24 of Figs. 1 and 2 and includes the upright members 69 and a cross bar 70 connecting these members. Upon this cross bar there is oscillatably mounted a locking unit in the form of a U-frame 71 which corresponds with the locking plate 29 previously described. This frame 71 has the free end portion of each of its legs bent to form a semi-circular collar 72 for partially encircling the bar 70 and opposing this collar portion is a detachable semi-circular collar 73 which encircles the opposite half of the bar 70 from the collar portion 72 and is secured to the latter as illustrated in Fig. 9.

Upon the side of the structure 68 remote from the driver's seat of the machine, the semi-circular clamping collar 73 has secured thereto the flattened end portion 74 of an upwardly curving yoke 75 which terminates in its other end in the spindle 76 which is disposed in axial alinement with the bar 70. At the opposite side of the frame structure 68 from the yoke 75, there is a downwardly curving yoke 77, one end of which is flattened and secured to the collar portion 72 of the frame 71, as indicated at 78, while the opposite end is formed to provide the eye 79 through which the spindle 76 passes. Disposed longitudinally of the vertical bar 69 to extend across the spindle 66, is a plate 80 which is provided with a suitable aperture for the passage of the spindle 76 therethrough, as shown in Fig. 9, and this plate 80 is secured to the adjacent bar or post 69 by U-bolts 81, there being spacing blocks 82 interposed between the plate and the adjacent post to maintain the plate in the proper position so as not to interfere with the turning of the yokes.

Upon the outer end of the spindle 80 a gear pinion 83 is secured.

Upon a suitable pivot pin 84 which extends through the plate 80 below the pinion 83, there is oscillatably mounted the elongated gear segment 85, the upper end of which is formed to provide the gear teeth 86 which mesh with the pinion 83. This segment 85 is maintained in vertical position by a weight 87 which is attached to the lower end of the plate by a resilient steel strap 88. Encircling the weight 87 and suitably secured to the adjacent post 69 as by welding or the like, is a cage 89 in which the weight 87 is enclosed. This cage serves to limit the swinging movement of the weight and also prevents damage being done to the automatic locking plate mechanism.

By the provision of the mechanism just described, the excessive or extreme tipping of the tractor unit is prevented automatically when the machine passes along the side of a hill or along a slope, as it will be readily apparent that when the machine tips over to the right or to the left, it being understood that there will be one of these automatic plates upon each side of the machine like the plates 29, the weight 87 will swing in the direction of tilt and this will cause the adjacent locking frame to swing down to substantially horizontal position where it will obstruct the inward movement of the inner leg of the frame 19 with respect to the body of the tractor. The position assumed by the frame 71 for limiting the movement of the frame 19 will be the same as that shown in broken lines in Fig. 3 in connection with the hand controlled locking plate 29.

What is claimed is:

1. A cultivator mechanism for standing plants, comprising a tractor unit having tandem ground engaging traction means, a plant row straddling frame disposed at each side of said tractor at the forward end thereof and secured thereto, a wheel supported plant row straddling frame at each side of the tractor adjacent the rear thereof, the wheels of said latter frame engaging the ground at the far sides of plant rows between which the tractor passes, and a cultivator unit coupled with each of said first-mentioned frames in advance of said wheels.

2. A cultivator mechanism for standing plants, comprising a tractor unit having tandem ground engaging traction means, a plant row straddling frame disposed at each side of said tractor at the forward end thereof and secured thereto, a wheel supported plant row straddling frame at each side of the tractor adjacent the rear thereof, the wheels of said latter frame engaging the ground at the far sides of plant rows between which the tractor passes, a cultivator unit coupled with each of said first-mentioned frames in advance of said wheels, and means facilitating the lateral movement of said cultivator units with respect to the tractor and the frames to which they are attached.

3. In a machine for cultivating rows of standing plants, a tractor unit having tandem ground engaging supporting means, said supporting means including means for propelling the tractor over the ground, a pair of arching frames secured to the forward portion of said tractor unit at the sides thereof and adapted to straddle the adjacent rows of plants, each of said frames including a horizontally extending bar disposed upon the side of the adjacent row remote from the tractor, a cultivating unit coupled with each bar, a second pair of arch frames secured to the rear of the tractor at the sides thereof and each having an axle disposed upon the side of the adjacent plant row remote from the tractor, a ground engaging wheel carried by each axle, bracing means connecting the adjacent front and rear frames, and means operable from the tractor for shifting said cultivator units vertically for engagement with or disengagement from the ground.

4. In a machine for cultivating rows of standing plants, a tractor unit having tandem ground engaging supporting means, said supporting means including means for propelling the tractor over the ground, a pair of arching frames secured to the forward portion of said tractor unit at the sides thereof and adapted to straddle the adjacent rows of plants, each of said frames including a horizontally extending bar disposed upon the side of the adjacent row remote from the tractor, a cultivating unit coupled with each bar, a second pair of arch frames secured to the rear of the tractor at the sides thereof and each having an axle disposed upon the side of the adjacent plant row remote from the tractor, a ground engaging wheel carried by each axle, bracing means connecting the adjacent front and rear frames, means operable from the tractor for shifting said cultivator units vertically for engagement with or disengagement from the ground, and means independent of said last-mentioned means for shifting the cultivator units from the tractor laterally with respect thereto and with respect to the frames to which they are attached.

5. A machine of the character described for cultivating parallel rows of standing plants, comprising a cultivator having a front supporting steering wheel, a frame for the cultivator, a traction mechanism disposed upon the longitudinal center of and beneath the rear of the cultivator, means for driving the traction mechanism, a pair of substantially U-shaped inverted frames disposed at opposite sides of the tractor adjacent the front thereof, each of said frames extending laterally from the tractor and each having an end of one side secured to the tractor frame, the other side of each U-frame terminating in a laterally extending bar, a second pair of inverted U-shaped frames disposed adjacent the rear of the tractor at the sides thereof, pivotal coupling means between one side of each of said second pair of frames and the tractor frame whereby the second-mentioned frames may oscillate in a vertical plane, the other side of each of the second-mentioned frames terminating in a laterally extending axle, a ground engaging wheel carried upon each axle, a cultivator unit attached to the bar of each of the first-mentioned U-frames, and the said U-frames upon each side of the tractor being in alined relation whereby they may pass longitudinally along and over a row of plants.

6. A machine of the character described for cultivating parallel rows of standing plants, comprising a cultivator having a front supporting steering wheel, a frame for the cultivator, a traction mechanism disposed upon the longitudinal center of and beneath the rear of the cultivator, means for driving the traction mechanism, a pair of substantially U-shaped inverted frames disposed at opposite sides of the tractor adjacent the front thereof, each of said frames extending laterally from the tractor and each having an end of one side secured to the tractor frame, the other side of each U-frame terminating in a laterally extending bar, a second pair of inverted U-shaped frames disposed adjacent the rear of the tractor at the sides thereof, pivotal coupling means between one side of each of said second pair of frames and the tractor frame whereby the second-mentioned frames may oscillate in a vertical plane, the other side of each of the second-mentioned frames terminating in a laterally extending axle, a ground engaging wheel carried upon each axle, a cultivator unit attached to the bar of each of the first-mentioned U-frames, the said U-frames upon each side of the tractor being in alined relation whereby they may pass longitudinally along and over a row of plants, and means carried by the first-mentioned U-frames and connected with the adjacent cultivator units and operable from a point remote therefrom for shifting said cultivator units laterally with respect to the tractor.

7. Mechanism for cultivating between rows of standing plants, comprising a tractor structure including a frame, a forward supporting wheel for the tractor, a ground engaging driving means for the tractor at the rear thereof, said driving means and wheel being in tandem relation beneath the central part of the tractor frame, a pair of elongated substantially U-shaped frames disposed in inverted position at the sides of said frame adjacent the rear thereof, each of said U-frames having one side pivotally attached to the first frame, the other side of each U-frame terminating in a laterally extending axle, a ground engaging wheel mounted upon each axle, yieldable means normally urging each U-frame to swing outwardly from the tractor, a pair of elongated inverted vertically disposed U-frames arranged upon opposite sides of the first frame adjacent the front thereof, each of said last-mentioned U-frames having one side rigidly secured to the first frame and having a laterally extending bar integral with the other side thereof, a cultivator unit connected with each of said bars, each of said units being designed for vertical movement with respect to the bar, and means operable from a position adjacent the rear of the tractor for raising said units.

8. Mechanism for cultivating between rows of standing plants, comprising a tractor structure including a frame, a forward supporting wheel for the tractor, a ground engaging driving means for the tractor at the rear thereof, said driving means and wheel being in tandem relation beneath the central part of the tractor frame, a pair of elongated substantially U-shaped frames disposed in inverted position at the sides of said frame adjacent the rear thereof, each of said U-frames having one side pivotally attached to the first frame, the other side of each U-frame terminating in a laterally extending axle, a ground engaging wheel mounted upon each axle, yieldable means normally urging each U-frame to swing outwardly from the tractor, a pair of elongated inverted vertically disposed U-frames arranged upon opposite sides of the first frame adjacent the front thereof, each of said last-mentioned U-frames having one side rigidly secured to the first frame and having a laterally extending bar integral with the other side thereof, a cultivator unit connected with each of said bars, each of said units being adapted for selective vertical and horizontal movement, means operable from a position on the tractor remote from the units for effecting the raising of the units, and means operable from said position on the tractor for effecting the lateral movement of the units with respect to the tractor.

9. In a mechanism for cultivating between rows of standing plants, a tractor structure having a base frame, supporting wheels for the tractor disposed in tandem relation on the longitudinal center of the tractor, a shaft mounted upon each side of the base frame adjacent the rear thereof for oscillation on a horizontal axis extending longitudinally of the frame, an inverted substantially U-shaped elongated frame at each side of the base frame, each of said U-frames having pivotal connection between one leg thereof and a shaft, each of said U-frames being disposed in a plane extending transversely of the tractor, an axle carried by the other leg of each U-frame, a ground engaging wheel supported by each axle, yieldable means connected with each U-frame and normally urging the oscillation of the same outwardly from the tractor, means for securing each U-frame against swinging movement toward the tractor, an elongated inverted substantially U-shaped frame upon each side of the base frame adjacent the forward end thereof and having one leg rigidly secured to the base frame, each of said last-mentioned U-frames being disposed in a plane extending transversely of the tractor, a plow unit disposed rearwardly of each of the second-mentioned U-frames, coupling means between each plow unit and the other leg of each second-mentioned frame facilitating vertical and transverse movement of the unit, an arm oscillatably mounted upon each of the second-mentioned U-frames and having one end operatively coupled with the adjacent unit, the other end of each arm extending to a position adjacent the top of the tractor, a pair of levers extending longitudinally of the tractor and each oscillatably mounted intermediate its ends and having its forward end connected with one of said arms, the other end of each lever being formed to provide a yoke in which the knee of an operator of the tractor may engage, each of said levers when oscillated effecting the oscillation of an arm and the lateral movement of a unit, and means for raising each unit.

10. Cultivating mechanism for rows of standing plants, comprising a wheel supported power unit, the wheels of said unit being disposed in tandem on the longitudinal center of the unit, a series of pairs of downwardly opening bows disposed at the sides of the unit, the bows of each pair being disposed in planes extending transversely of the unit, pivotal coupling means between each bow of one pair and the unit whereby such bows are permitted oscillatory movement in a vertical plane, the other side of each of said pivoted bows carrying a ground engaging wheel, resilient means normally urging each pivoted bow to swing outwardly, each of the bows of a second pair being rigidly secured at one side to the power unit, ground working elements connected with the other side of each bow of the second pair and adapted to have vertical and horizontal movement with respect thereto, means for selectively effecting the said vertical and horizontal movement of the ground working elements from a position on the tractor remote from the elements, and a bracing connecting means between the outer sides of the adjacent bows at each side of the unit.

11. Cultivating mechanism for rows of standing plants, comprising a wheel supported power unit, the wheels of said unit being disposed in tandem on the longitudinal center of the unit, a series of pairs of downwardly opening bows disposed at the sides of the unit, the bows of each pair being disposed in planes extending transversely of the unit, pivotal coupling means between each bow of one pair and the unit whereby such bows are permitted oscillatory movement in a vertical plane, the other side of each of said pivoted bows carrying a ground engaging wheel, resilient means normally urging each pivoted bow to swing outwardly, each of the bows of a second pair being rigidly secured at one side to the power unit, ground working elements connected with the other side of each bow of the second pair and adapted to have vertical and horizontal movement with respect thereto, means for selectively effecting the said vertical and horizontal movement of the ground working elements from a position on the tractor remote from the elements, a vertical support disposed upon the power unit adjacent the inner side of each pivotally mounted bow, and locking means carried by each support for engagement between the latter and the adjacent bow to prevent the adjacent bow from swinging inwardly against the resistance of the adjacent resilient means.

12. Cultivating mechanism for rows of standing plants, comprising a wheel supported power unit, the wheels of said unit being disposed in tandem on the longitudinal center of the unit, a series of pairs of downwardly opening bows disposed at the sides of the unit, the bows of each pair being disposed in planes extending transversely of the unit, pivotal coupling means between each bow of one pair and the unit whereby such bows are permitted oscillatory movement in a vertical plane, the other side of each of said pivoted bows carrying a ground engaging wheel, resilient means normally urging each pivoted bow to swing outwardly, each of the bows of a second pair being rigidly secured at one side to the power unit, ground working elements connected with the other side of each bow of the second pair and adapted to have vertical and horizontal movement with respect thereto, means for selectively effecting the said vertical and horizontal movement of the ground working elements from a position on the tractor remote from the elements, a vertical support mounted upon the power unit adjacent the inner side of each pivotally mounted bow, a normally vertically disposed locking element pivotally mounted upon each support, and means for effecting the outward and downward swinging of each locking means to interpose the same between the said support and the adjacent bow to prevent the latter from swinging inwardly toward the unit.

13. Cultivating mechanism for rows of standing plants, comprising a wheel supported power unit, the wheels of said unit being disposed in tandem on the longitudinal center of the unit, a series of pairs of downwardly opening bows disposed at the sides of the unit, the bows of each pair being disposed in planes extending transversely of the unit, pivotal coupling means between each bow of one pair and the unit whereby such bows are permitted oscillatory movement in a vertical plane, the other side of each of said pivoted bows carrying a ground engaging wheel, resilient means normally urging each pivoted bow to swing outwardly, each of the bows of a second pair being rigidly secured at one side to the power unit, ground working elements connected with the other side of each bow of the second pair and adapted to have vertical and horizontal movement with respect thereto, means for selectively effecting the said vertical and horizontal movement of the ground working elements from a position on the tractor remote from the elements, a vertical support mounted upon the power unit adjacent the inner side of each pivotally mounted bow, a normally vertically disposed locking element pivotally mounted upon each support, a gear coupled with said locking unit for rotation coaxially therewith, a vertically disposed gear segment pivotally mounted beneath said gear and vertically disposed, the upper end of said segment having toothed connection with the gear, and a weight suspended from the lower end of the gear segment for effecting the oscillation of the segment upon the transverse tilting of the power unit to oscillate said locking unit outwardly and downwardly between the support and the adjacent pivoted bow.

JOHN T. COVINGTON.